US006799370B2

United States Patent
Shekel et al.

(10) Patent No.: US 6,799,370 B2
(45) Date of Patent: Oct. 5, 2004

(54) MANUFACTURING TECHNIQUE FOR OPTICAL FIBER ARRAY

(75) Inventors: Eyal Shekel, Jerusalem (IL); Eli Rephaeli, Neve Daniel (IL)

(73) Assignee: Chiaro Networks Ltd., Jerusalem (IL)

( * ) Notice: Subject to any disclaimer, the term of this patent is extended or adjusted under 35 U.S.C. 154(b) by 355 days.

(21) Appl. No.: 09/892,866

(22) Filed: Jun. 28, 2001

(65) Prior Publication Data

US 2003/0002847 A1 Jan. 2, 2003

(51) Int. Cl.[7] .......................... H01R 43/00; H05K 13/00
(52) U.S. Cl. ........................... 29/854; 29/850; 29/707; 29/720; 29/721; 385/90; 385/147
(58) Field of Search .......................... 29/854, 850, 707, 29/720, 721; 385/90, 147

(56) References Cited

U.S. PATENT DOCUMENTS

| | | | |
|---|---|---|---|
| 5,037,181 A | 8/1991 | Byer et al. .................. 385/144 |
| 5,138,676 A | 8/1992 | Stowe et al. .................. 385/32 |
| 5,177,348 A | 1/1993 | Laor | |
| 5,261,156 A * | 11/1993 | Mase et al. .................... 29/832 |
| 5,377,286 A * | 12/1994 | Iida et al. ...................... 385/33 |
| 5,394,498 A * | 2/1995 | Hinterlong et al. .......... 385/115 |
| 5,446,815 A * | 8/1995 | Ota et al. ...................... 385/33 |
| 5,452,393 A | 9/1995 | Stowe et al. ................. 385/123 |
| 5,677,973 A * | 10/1997 | Yuhara et al. ................. 385/90 |
| 5,852,700 A | 12/1998 | Caponi et al. | |
| 5,872,880 A * | 2/1999 | Maynard ....................... 385/88 |
| 5,926,594 A | 7/1999 | Song et al. | |
| 6,074,104 A * | 6/2000 | Higashikawa ................. 385/94 |
| 6,157,012 A * | 12/2000 | Tanaka et al. ............... 219/633 |
| 6,175,675 B1 | 1/2001 | Lee et al. | |
| 6,249,625 B1 | 6/2001 | Pan ............................. 385/43 |
| 6,442,451 B1 | 8/2002 | Lapham | |
| 6,480,651 B1 | 11/2002 | Rabinski | |
| 6,556,285 B1 | 4/2003 | Dickson | |
| 6,587,611 B1 | 7/2003 | Hunt | |
| 6,589,376 B1 * | 7/2003 | Davis et al. ................... 156/64 |
| 6,590,658 B2 | 7/2003 | Case et al. | |
| 6,654,523 B1 | 11/2003 | Cole | |
| 6,654,524 B2 * | 11/2003 | Shekel et al. ................. 385/52 |
| 2003/0053054 A1 | 3/2003 | Li et al. | |
| 2003/0063277 A1 | 4/2003 | Kennedy et al. | |

* cited by examiner

Primary Examiner—Carl J. Arbes
Assistant Examiner—Theim D Phan
(74) Attorney, Agent, or Firm—Nixon & Vanderhye P.C.

(57) ABSTRACT

An improved manufacturing technique for optical fiber arrays employs optical feedback in a partially assembled unit using an inspection camera. This allows immediate reworking of a problematic part. In the present invention, a video microscope is used to check the alignment of the optical fiber array during the manufacturing process. After the optical fiber array has been glued or otherwise affixed, then an optical device may be used to measure the performance of the glued assembly.

6 Claims, 10 Drawing Sheets

MANUFACTURING TECHNIQUE FOR OPTICAL FIBER ARRAY

BACKGROUND OF THE INVENTION

1. Field of the Invention

This invention relates to the manufacture of optical assemblies. More particularly this invention relates to the manufacture of a precisely aligned array of optical fibers.

2. Description of the Related Art

In the past, the assembly and manufacture of optical fiber arrays has been largely time consuming and prone to quality control problems. The latest developments in optical cross-connect assemblies have only magnified these problems. A general demand for more precisely constructed assemblies having greater reliability has translated into a demand for better manufacturing apparatus and processes. For example, the newest cross-connect assemblies place extreme importance on a well-adjusted optical system. These devices rely on the reception of modulated light on a light-receiving device from a multiplicity of fibers, in which the parameters of operation are precisely known differences in phase shift and polarization of the individual light beams. If the optical system is not finely tuned, then the device will not operate optimally, or may fail entirely. Precisely manufactured arrays of optical fibers are components of such cross-connect assemblies.

One way of ensuring an optical fiber array of high quality is to increase labor intensity and quality control. The increased labor allows more time per optical fiber array for alignment and adjustment. Increased quality control results in rejection of substandard optical fiber arrays. The disadvantages of this approach are dramatically increased cost, and the discarding of parts and material upon recognition of failure. A better strategy is to manufacture storage devices with maximized quality and efficiency.

As mentioned previously, parts and labor are the most expensive elements of an optical fiber array. In the past, optical elements were positioned by hand. An assembler would hold the elements in place and apply glue. Quality control would later determine if the optical part were properly placed. The problem with this method is that in the case of a misplaced piece additional labor is uselessly added to an optical fiber array. Typically, any repair attempt destroys the glued part, and increases labor cost.

SUMMARY OF THE INVENTION

In the present invention, optics are inspected during the assembly or immediately following assembly. An improved manufacturing technique for optical fiber arrays employs optical feedback in a partially assembled cross-connect assembly using an inspection camera. This allows immediate reworking of a problematic part. In the present invention, a video microscope is used to check the alignment of the optical fiber array during the manufacturing process. After the optical fiber array has been glued or otherwise affixed, then an optical device may be used to measure the performance of the glued assembly.

It is a primary object of some aspects of the present invention to align optical fiber array assemblies during manufacture in a precise and efficient manner.

It is another object of some aspects of the present invention to reduce the cost of manufacturing optical devices that employ optical fiber array assemblies.

The invention provides an apparatus for manufacturing a fiberoptic device, comprising a first stage, and a fiber rotator disposed on the first stage. The fiber rotator carries an optical fiber therein, and the stage is arranged to rotate the optical fiber about its optical axis. The apparatus further includes a second stage for holding a silicon slab, a fiber gripping assembly that is disposed between the first stage and the second stage for gripping an intermediate portion of the optical fiber. The apparatus further includes a first viewer directed toward the silicon slab along a Y-axis, and a second viewer directed toward an end face of the optical fiber in a Z-axis. Responsive to views provided by the first viewer and the second viewer, the first stage, the second stage, the fiber rotator, and the fiber gripping assembly are manipulated to establish the optical fiber in a desired position on the silicon slab.

According to another aspect of the invention, the apparatus includes a third stage, and a weight mounted on the third stage. A free end of the weight impinges on the optical fiber to urge an end portion of the optical fiber onto the silicon slab.

According to another aspect of the invention, the third stage is movable on the X-axis and the Z-axis.

According to still another aspect of the invention, the weight is pivotally mounted and pivots between a first position, wherein the weight is in a non-contacting relationship with the optical fiber and a second position, wherein the weight impinges on the optical fiber.

According to a further aspect of the invention, the weight includes a first weight that urges the end portion of the optical fiber into a groove formed in the silicon slab, and a second weight that urges the end portion of the optical fiber onto a flat portion of the silicon slab.

According to another aspect of the invention, a contacting surface of the free end of the weight is parallel to a top portion of the silicon slab when the contacting surface is in contact with the optical fiber.

According to yet another aspect of the invention, the fiber gripping assembly is supplied by a vacuum line, and includes a channel formed therein for establishing fluid communication between the vacuum line and a tip portion of the fiber gripping assembly, wherein the optical fiber is held in the tip portion of the fiber gripping assembly by suction produced in the channel.

According to a further aspect of the invention, the tip portion has a groove formed therein, and the optical fiber is received in the groove. The groove is dimensioned such that a surface of the optical fiber contacts a first side wall of the groove and contacts a second side wall of the groove.

According to an additional aspect of the invention, the first stage is movable on a vertical axis and is rotatable about the vertical axis.

According to an aspect of the invention, the second stage is movable about the Y-axis.

According to still another aspect of the invention, the second stage is connected to a vacuum line, and the silicon slab is exposed to vacuum transmitted via the vacuum line.

According to a further aspect of the invention, the second viewer includes a power and polarization detector, and the second viewer is linked to a motorized servomechanism that actuates at least one of the first stage, and the second stage.

According to yet another aspect of the invention, the first viewer is linked to the servomechanism.

The invention provides a method of manufacturing a fiberoptic array. The method includes disposing a silicon slab on an assembly station, gripping an optical fiber in a first gripping assembly for rotation about a Z-axis therein, gripping the optical fiber in a second gripping assembly for displacement thereof in an X-axis and a Y-axis, visualizing a position of the optical fiber relative the silicon slab, and responsive to the visualization, adjusting the position to a desired position, and then permanently affixing the optical fiber to the silicon slab in the desired position.

According to an additional aspect of the invention, housing is attached to the silicon slab, and the optical fiber is enclosed in the housing.

According to an aspect of the invention, a first groove is formed in the silicon slab. A second groove is formed in the housing, such that the optical fiber is embraced by the first groove and the second groove.

According to another aspect of the invention, the polarization axis of the optical fiber is determined by visualization, and responsive to the determination, the optical fiber is rotated about the Z-axis until its polarization axis attains a desired alignment.

According to a further aspect of the invention, a weight is applied to an intermediate portion of the optical fiber while adjusting the position of the fiber.

The invention provides an apparatus for manufacturing a fiberoptic device, which includes a first stage, a fiber rotator disposed on the first stage, the fiber rotator carrying an optical fiber therein, and rotating the optical fiber about an optical axis thereof. The apparatus further includes a second stage for holding a silicon slab, a fiber gripping assembly disposed between the first stage and the second stage for gripping an intermediate portion of the optical fiber. The fiber gripping assembly is supplied by a first vacuum line, and includes a channel formed therein for establishing fluid communication between the first vacuum line and a tip portion of the fiber gripping assembly. The optical fiber is held in the tip portion of the fiber gripping assembly by suction transmitted via the channel, wherein a groove is formed in the tip portion. The groove is dimensioned such that a surface of the optical fiber contacts both side walls of the groove. A first viewer is directed toward the silicon slab along the Y-axis, and a second viewer is directed toward an end face of the optical fiber in the Z-axis. A third stage is movable on an X-axis and the Z-axis. A first weight and a second weight, are mounted on the third stage, wherein a free end of the first weight and a free end of the second weight impinge on the optical fiber to urge an end portion of the optical fiber against the silicon slab. Responsive to views provided by the first viewer and the second viewer, the first stage, the second stage, the fiber rotator, and the fiber gripping assembly are manipulated to establish the optical fiber in a desired position on the silicon slab.

According to yet another aspect of the invention, the first weight and the second weight are pivotally mounted and independently pivot between a first position of non-contacting relationship with the optical fiber and a second position of impingement on the optical fiber.

According to still another aspect of the invention, the first stage is movable on a vertical axis and is rotatable about the vertical axis.

According to an additional aspect of the invention, the second stage is movable about the Y-axis.

According to an aspect of the invention, the second stage is connected to a second vacuum line, and the silicon slab is exposed to vacuum transmitted via the second vacuum line.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENTS

In the following description, numerous specific details are set forth in order to provide a thorough understanding of the present invention. However, it will be apparent to one skilled in the art that the present invention may be practiced without these specific details.

Figure 1:
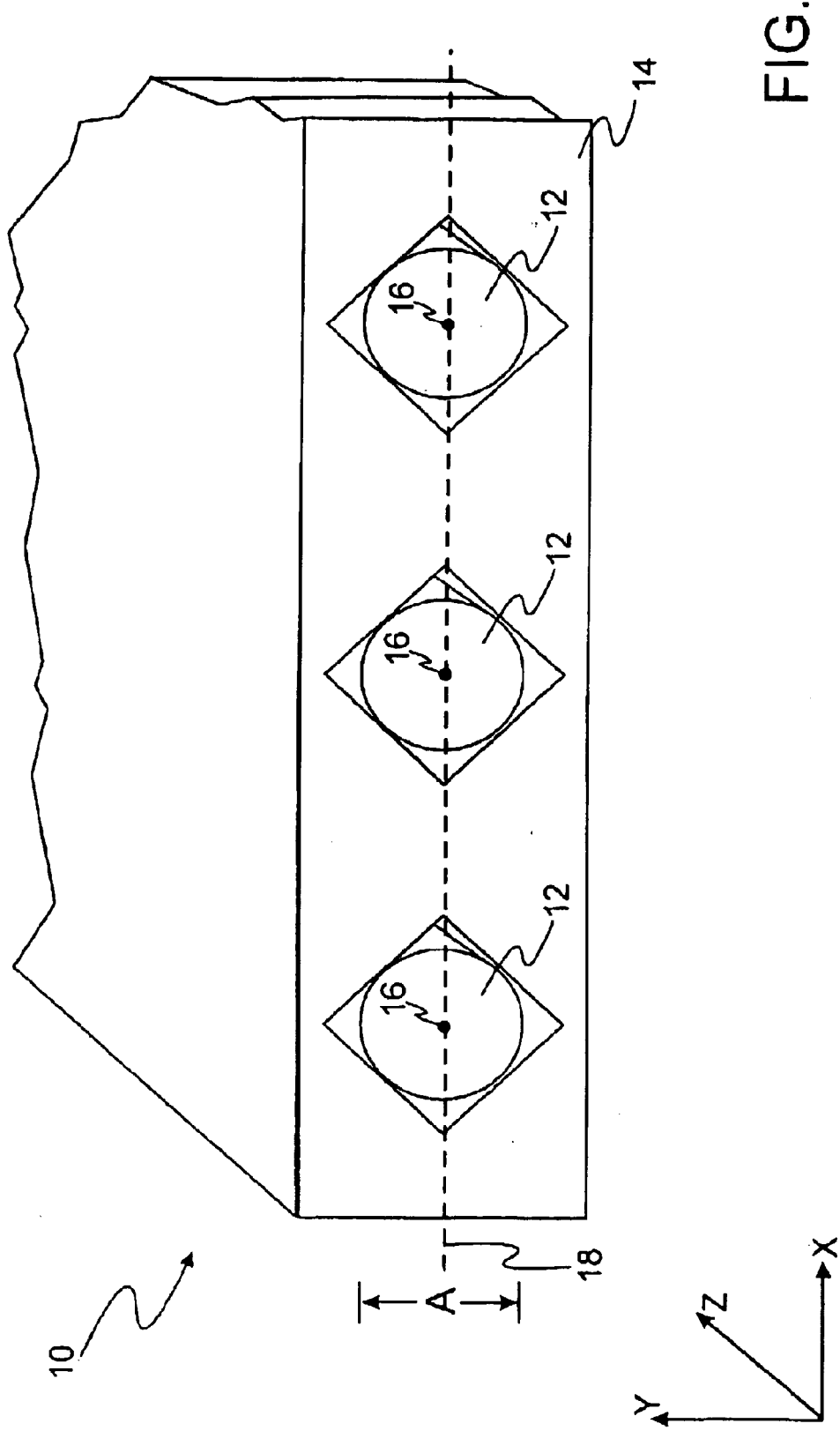
FIG. 1 is an elevation of a portion of a fiberoptic assembly that is constructed and operative in accordance with a preferred embodiment of the invention.

Turning now to the drawings, reference is made to FIG. 1, which illustrates a portion of a fiberoptic assembly that is aligned during manufacture in accordance with a preferred embodiment of the invention. The fiber-optic assembly 10 includes a linear array of optical fibers 12, which is secured within a housing 14. The optical fibers 12 are mutually aligned, such that their geometric centers 16 lie along a straight line 18. It is required that the deviation from co-linearity in the Y-axis of the geometric centers 16 be maintained within a tolerance shown as the distance "A", In the preferred embodiment the distance "A" cannot exceed two microns. Such close tolerances are essential for the fiberoptic assembly 10 to function correctly in devices such as optical switches.

Figure 2:
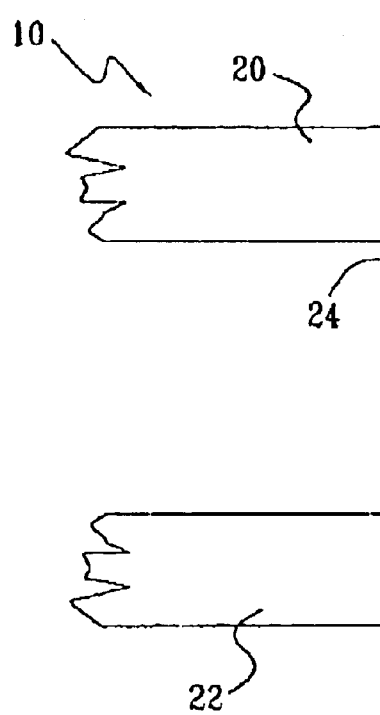
FIG. 2 is an exploded side elevation of the fiber-optic assembly shown in FIG. 1.

Reference is now made to FIG. 2, wherein the fiber-optic assembly 10 is shown in further detail in an exploded view. The description of FIG. 2 is to be read in conjunction with FIG. 1. The housing 14 has a top portion 20 and a bottom portion 22. Formed in each of the top portion 20 and the bottom portion 22 are V-shaped grooves 24, 26. When the top portion 20 is approximated to the bottom portion 22, an optical fiber 12 is received by the grooves 24, 26, which hold the optical fiber 12 firmly in position. Each of the optical fibers in the fiberoptic assembly 10 is similarly arranged. Nevertheless, it is technically difficult to align the optical centers of the fibers as required.

Figure 3:
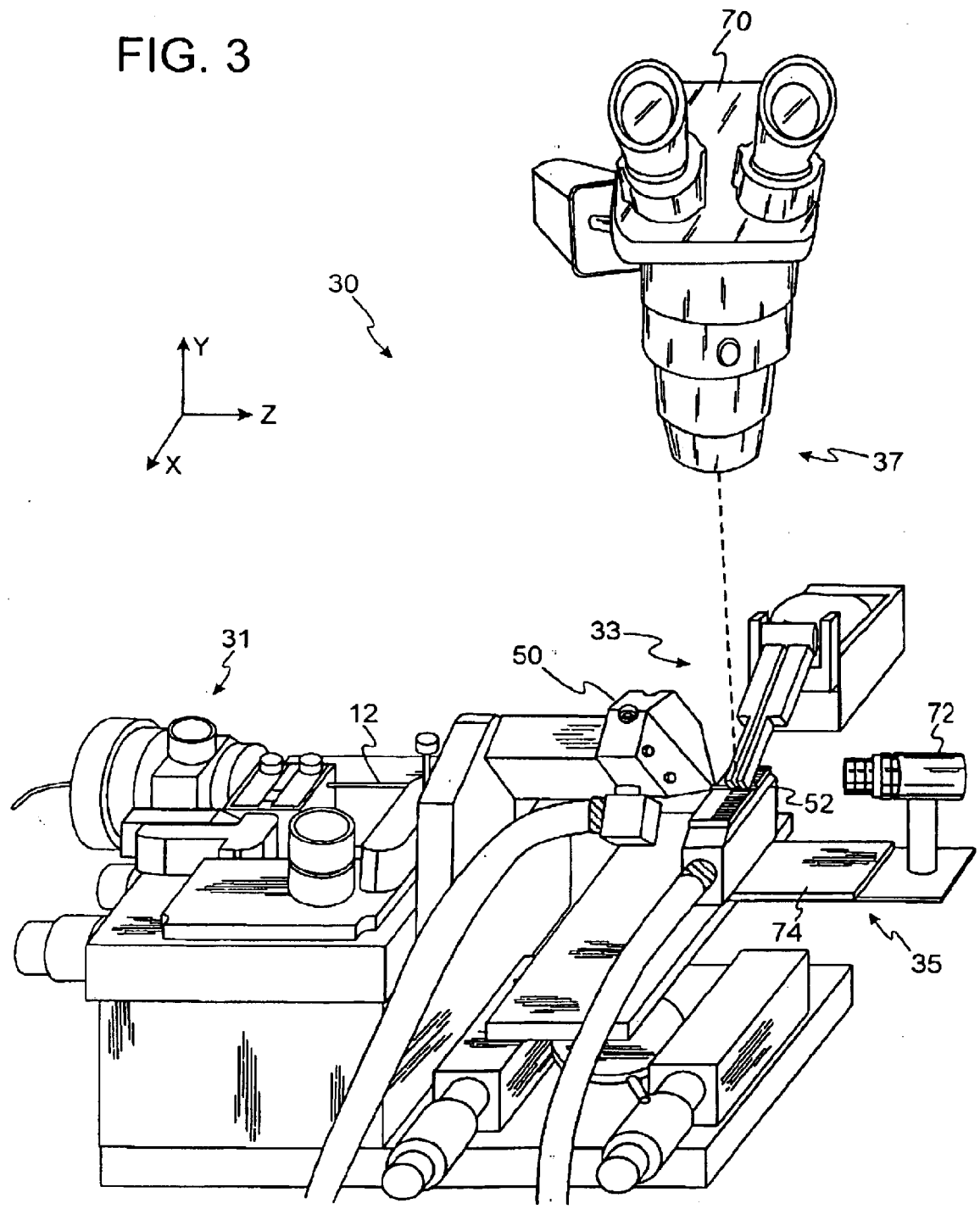
FIG. 3 is a perspective view illustrating a fiber-optic assembly station that is constructed and operative in accordance with a preferred embodiment of the invention.

Reference is now made to FIG. 3, which illustrates an optico-mechanical assembly station that is constructed and operative in accordance with a preferred embodiment of the invention. An assembly station 30, which is adapted for the manufacture of fiberoptic assemblies, such as the fiberoptic assembly 10 (FIG. 1), comprises four sections: a optical fiber positioning sub-assembly 31, an optical fiber stabilizing sub-assembly 33, a substrate holding sub-assembly 35 and a viewing section 37.

In describing the assembly station 30 and its operation, the following conventions are used herein. The Z-axis is nominally horizontal, and coincides with the optical axis of an optical fiber that is being held and manipulated. The X-axis refers to the horizontal axis that is orthogonal to the Z-axis. The Y-axis is the vertical axis, and is orthogonal to both the X and Z axes. Rotation about the X-axis, Y-axis, and Z-axis is referred to as theta-X, theta-Y and theta-Z motion respectively. Of course, it is possible to operate the assembly station 30 in many positions and orientations, in which case the X-axis, Y-axis, and Z-axis are appropriately translated.

Figure 4:
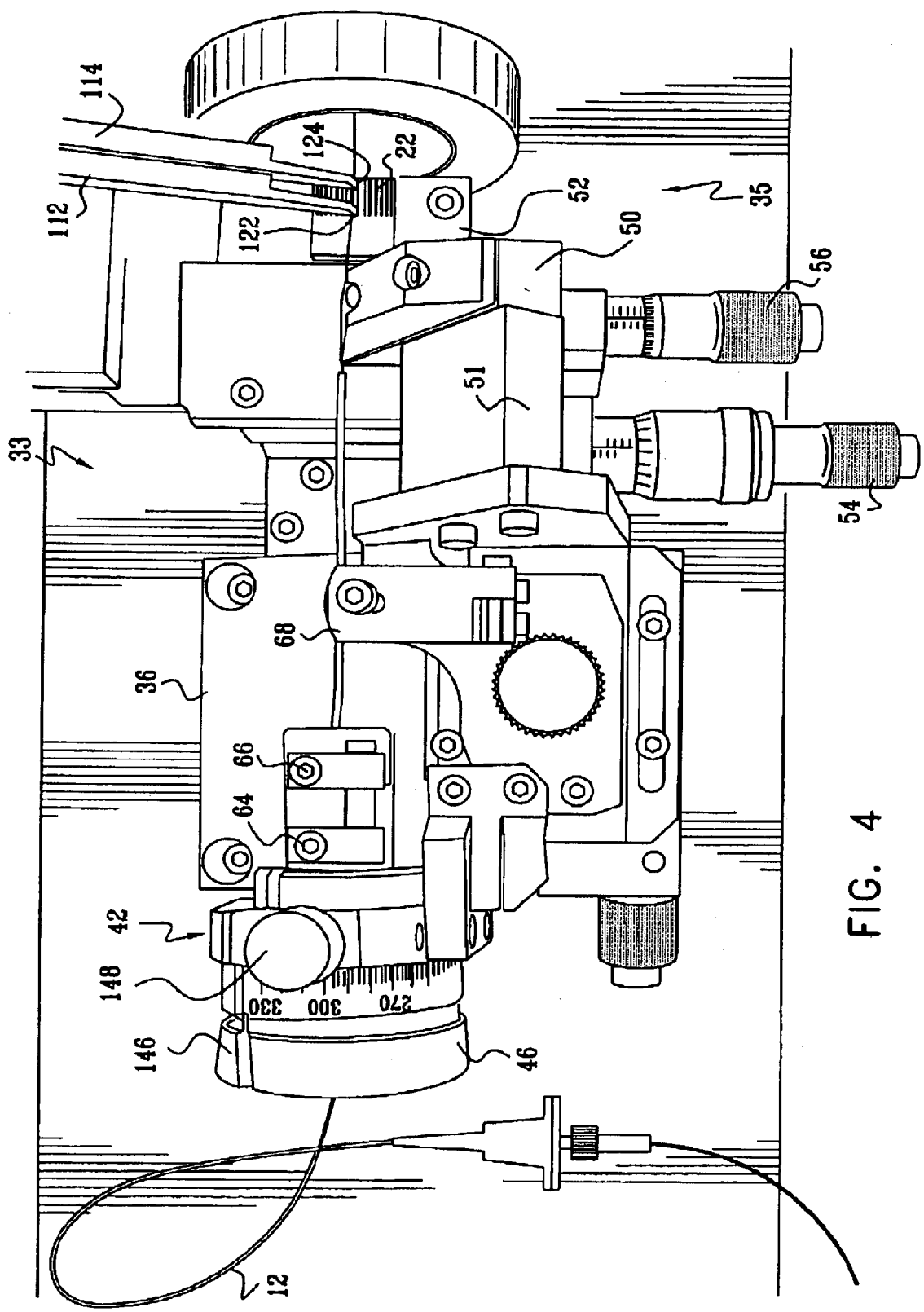
FIG. 4 is a top view of the portion of an assembly station similar to that shown in FIG. 3.
Figure 5:
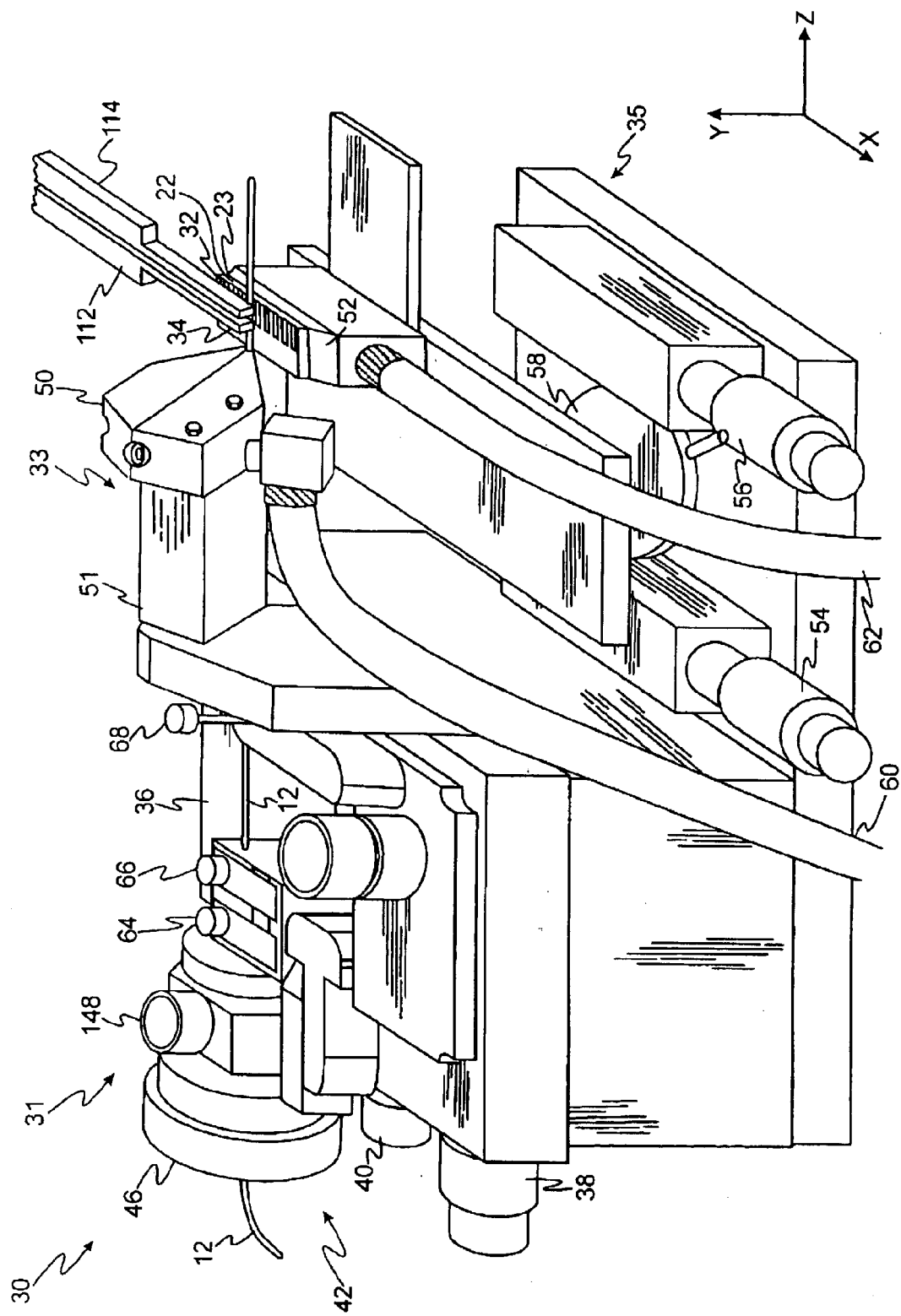
FIG. 5 is a perspective view of a portion of the assembly station shown in FIG. 3.

Reference is now made to FIG. 4 and FIG. 5. FIG. 4 is a top view of a portion of an assembly station 30 similar to that shown in FIG. 3. FIG. 5 is a perspective view of a portion of the assembly station 30. The description of FIG. 4 and FIG. 5 is to be read in conjunction with FIG. 1 and FIG. 3. The optical fiber positioning sub-assembly 31 and a portion of the optical fiber stabilizing sub-assembly 33 are supported by a stage 36. The optical fiber positioning sub-assembly 31 includes an actuator 38, and an actuator 40, which control movements of the stage 36. The optical fiber positioning sub-assembly 31 also includes a fiber rotator 42, an actuator 46 which controls the fiber rotator 42, and a clamp 148 which secures a fiber 12 in the fiber rotator 42.

The optical fiber stabilizing sub-assembly 33 includes a clamp 64, a clamp 66, and a clamp 68, which are carried on the stage 36, for stabilizing a portion of the fiber 12 near the fiber rotator 42. The optical fiber stabilizing sub-assembly 33 also includes a gripping assembly 50, a weight 112, and a weight 114 for stabilizing the fiber 12 near the optical assembly into which it is to be incorporated. A bottom portion 22 of such an optical assembly is shown in a working position in FIG. 4 and FIG. 5.

The substrate holding sub-assembly 35 includes a vacuum plate stage 52, a hose 62 for supplying vacuum to the vacuum plate stage 52, an actuator 54, an actuator 56, and a rotation control 58 for controlling movements of the vacuum plate stage 52.

The viewing section 37 includes a video camera 72, which provides a view parallel to the Y-axis, and a stereo-microscope 70, which is aligned generally with the Z-axis. Reference is again made to FIG. 1, FIG. 2, and FIG. 5. The objectives of the operations performed by the assembly station 30 are now presented in order to assist in understanding its structure and operation. Using the assembly station 30, each fiber 12 of the fiberoptic assembly 10 is sequentially secured in proper alignment to the bottom portion 22, which can be a silicon slab. In some embodiments the bottom portion 22 has a grooved section 32 in which a plurality of V-grooves are aligned parallel to the Z-axis, and has a flat section 34. When all the fibers have been secured such that their free ends lie in designated grooves of the grooved section 32, horizontally aligned with one another. If the fibers are polarizing optical fibers, their polarization axes each have a desired alignment. The top portion 20 is then affixed to the bottom portion 22 as a separate operation to complete the assembly.

Reference is again made to FIG. 3, FIG. 4, and FIG. 5. The stage 36 is provided for holding and manipulating components of the fiberoptic assembly 10. The stage 36 is capable of displacement along the Z-axis, and can be rotated about the Z-axis, using the actuators 38, 40. The fiber rotator 42, adapted for gripping an individual fiber 12 of the fiberoptic assembly during assembly, is mounted on the stage 36 and is oriented in the Z-axis. A slit 146 is provided in the fiber rotator 42 for receiving an optical fiber therethrough. The fiber rotator 42 includes the actuator 46, which is capable of rotating the fiber 12 about its optical axis, with 360-degree freedom of rotation. In the case of polarization mounted single-mode fibers, this capability allows the fiber 12 to be aligned with respect to its polarization axis. The fiber rotator 42 is a known component, and a suitable version is available as model F265-R from Suruga Seiki, OST Division, Shizuoka, Japan. Cooperating with the fiber rotator 42 is the fiber gripping assembly 50, which opposes the fiber rotator 42 and is specialized to hold the optical fiber 12 while it is seated in its designated groove of the grooved section 32 during assembly. The gripping assembly 50 is mounted on the stage 36 by a bracket 51. It can move independently in the X-axis, Z-axis, and is capable of theta-X and theta-Z motion as well. The bottom portion 22 is carried on a vacuum plate stage 52 having freedom of movement along the Y-axis and the X-axis, as well as having freedom of rotation about the Y-axis. The actuators 54, 56 and the rotation control 58 control the movement of the vacuum plate stage 52.

Vacuum is maintained by a vacuum hose 60, which leads from the gripping assembly 50 to a suitable pump (not shown). Vacuum is provided to the vacuum plate stage 52 by a hose 62 for stabilizing the bottom portion 22. The clamps 64, 66, 68 provide further stabilization for the fiber 12 during the assembly and alignment operations.

The fiberoptic assembly under construction is viewed along the Y-axis on the vacuum plate stage 52 by the stereo-microscope 70 (FIG. 3), which is conventional. In practice, the stereo-microscope 70 can be linked to a monitor (not shown) for the convenience of the operator. The video camera 72, mounted on a movable stage 74, observes the vacuum plate stage 52 horizontally, in line with the Z-axis. Using the video camera 72, the end face of the optical fiber 12 can be visualized as it is being positioned in the bottom portion 22. It should be noted that while the video camera 72 has freedom of adjustment in the X, Y, and Z-axes independently, in operation there is no relative movement between the stage 74 and the vacuum plate stage 52. Using the stereo-microscope 70 and the video camera 72, the operator can view the process of assembly of the fiberoptic assembly 10 along two orthogonal axes, the Y-axis and the Z-axis. The video camera 72 is capable of high magnification, and is connected to a display monitor (not shown). Cameras suitable for the video camera 72 are available from Mitutoya Corp.

Figure 6:
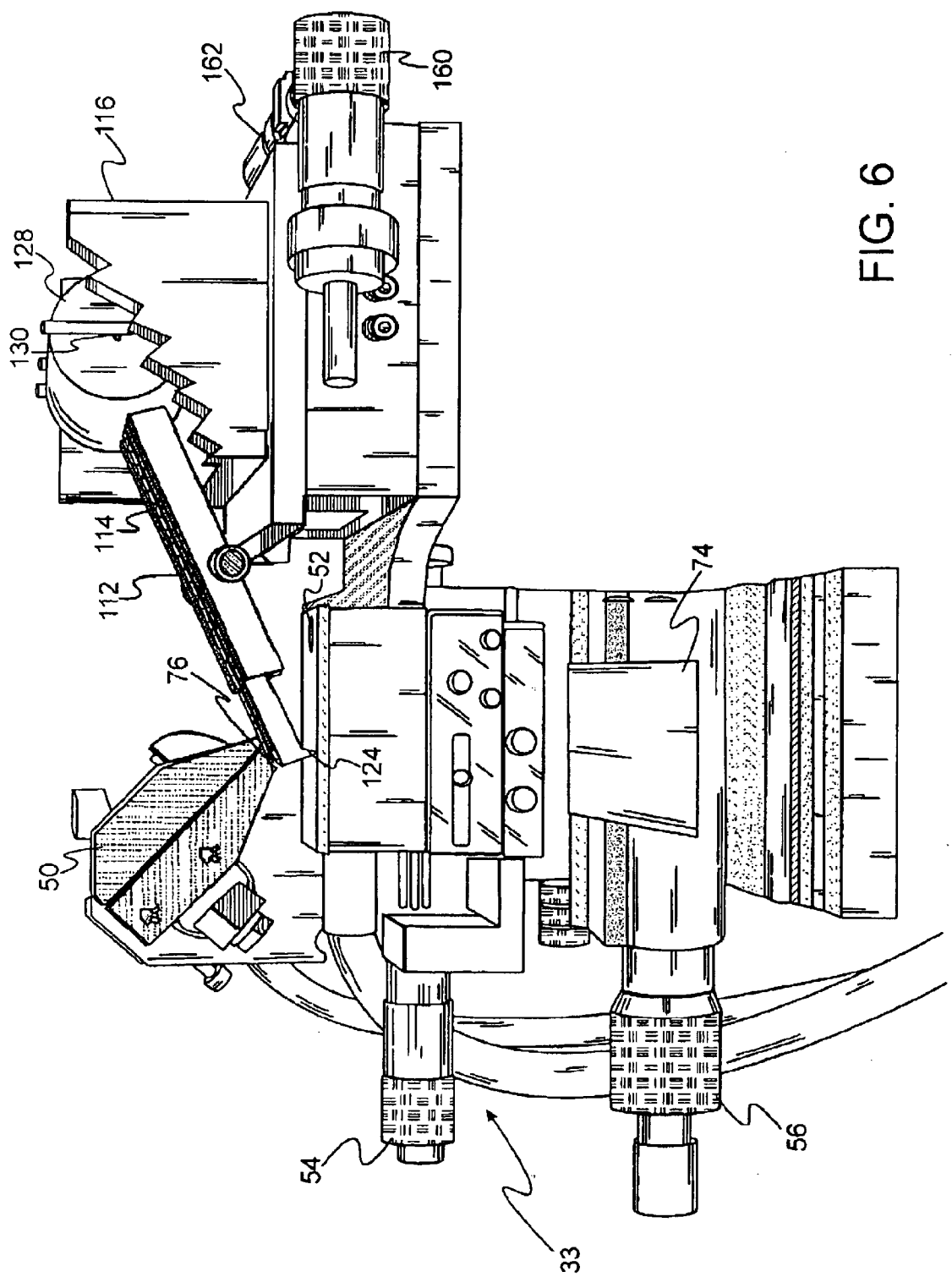
FIG. 6 is a side elevation of the assembly station shown in FIG. 5.

Reference is now made to FIG. 6, which is a side elevation of the assembly station 30, and illustrates additional components of the optical fiber stabilizing sub-assembly 33. The description of FIG. 6 is to be read in conjunction with FIG. 2, FIG. 3, FIG. 4, and FIG. 5. The gripping assembly 50 is disposed behind the vacuum plate stage 52. Vacuum is employed to urge the fiber 12 against the gripping assembly 50 at a point near the end face of the fiber 12, such that stability of the fiber 12 with respect to the vacuum plate stage 52 is assured during manipulation. The weights 112, 114 are mounted on a stage 116, and are pivotable, as explained in further detail hereinbelow.

Weights 112, 114 are preferably identical in structure. The stage 116 is provided with an X-actuator 160 and a Z-actuator 162 that adjust the position of the stage 116 in the X- and Z-axes, such that the free ends 122, 124 (FIG. 4) can be accurately positioned over a desired portion of the vacuum plate stage 52. The weights 112, 114 impinge on the vacuum plate stage 52 and more particularly on a portion of the optical fiber 12 lying in the groove 26 while being currently manipulated. The weight 114 is positioned to assist in coupling an optical fiber 12 into its assigned groove 26 at the edge of the silicon slab 126. As best seen in FIG. 4, the weight 112 is positioned in order to position the optical fiber 12 onto the more proximal non-grooved portion of the silicon slab 126 by applying the weight 112 to the optical fiber 12.

Figure 8:
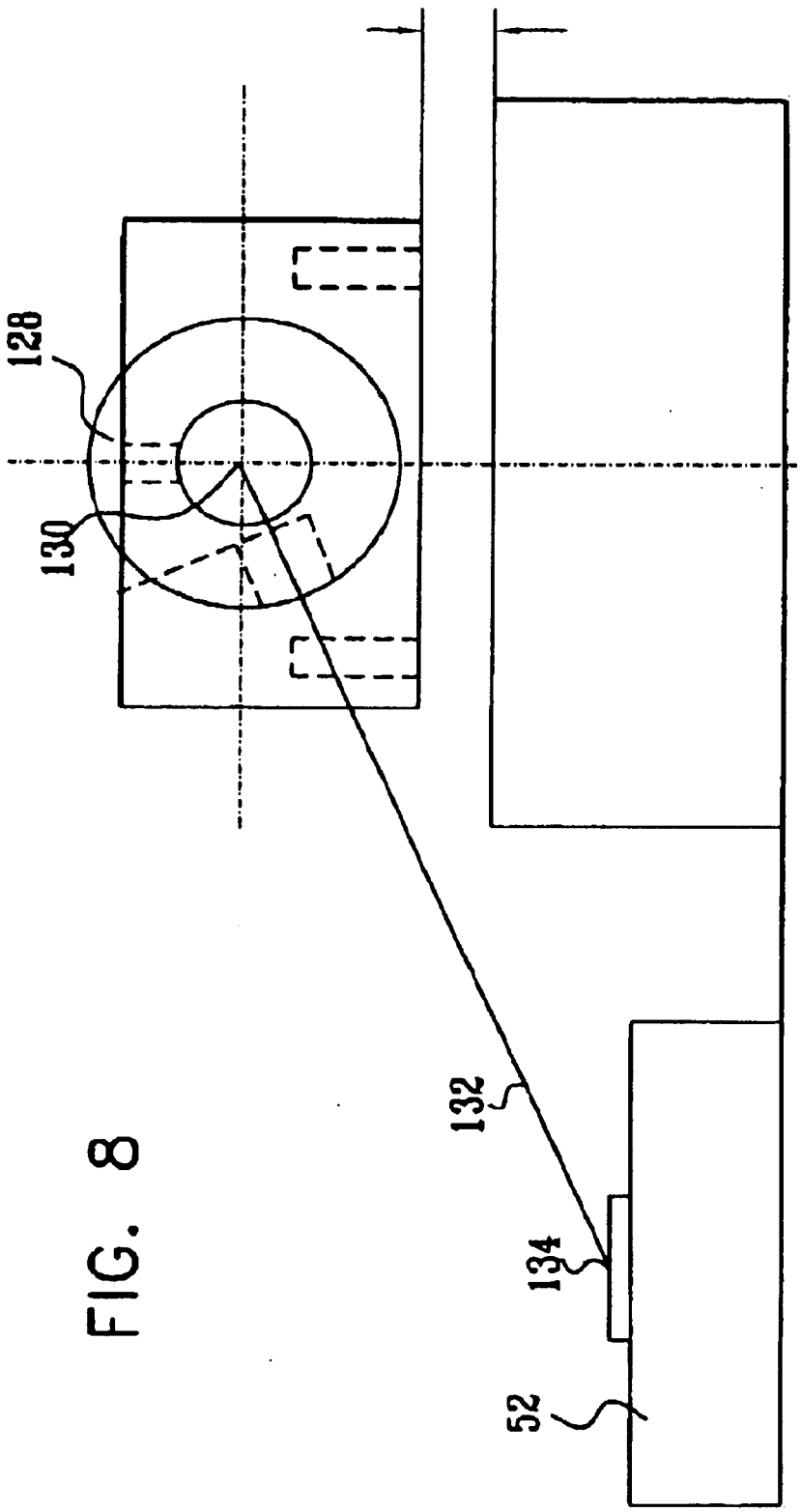
FIG. 8 is a schematic view of a weight subassembly of the assembly station shown in FIG. 3.

Reference is now made to FIG. 8, which illustrates the structure of the weights 112, 114 in greater detail. The description of FIG. 8 is to be read in conjunction with FIG. 6. A wheel 128 is affixed to both the weights 112, 114, and pivots about an axis 130. The wheel 128 is counterweighted to provide precision in movement and weighting. A shaft 132 is rigidly attached to the wheel 128, and extends radially in the direction of the vacuum plate stage 52. The shaft 132 is dimensioned so that its free end 134 impinges on the vacuum plate stage 52 as the wheel 128 is revolved.

Figure 9:
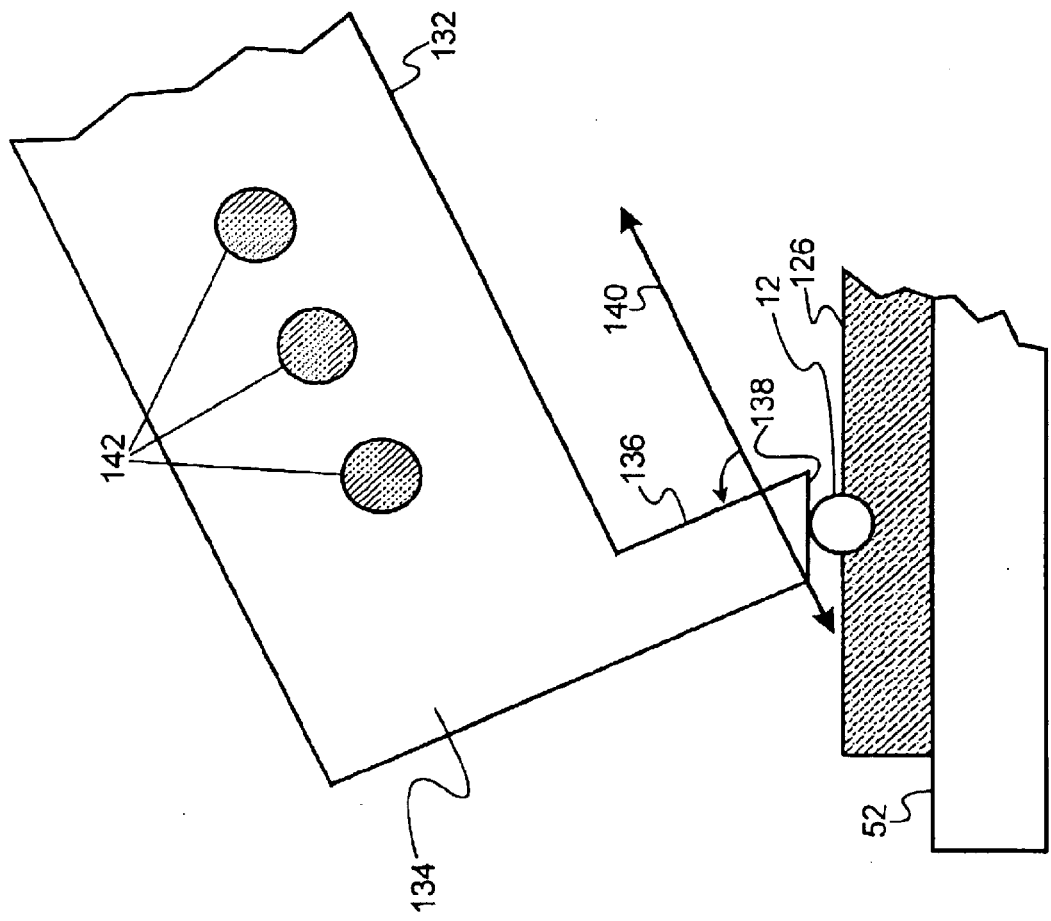
FIG. 9 is an enlarged schematic view of a portion of the weight subassembly of the assembly station shown in FIG. 3.

Reference is now made to FIG. 9, which illustrates the structure of the free end 134 of the shaft 132 in further detail. The description of FIG. 9 is to be read in conjunction with FIG. 6 and FIG. 8. A tip 136 extends downward from the shaft 132 and terminates in a face 138. The face 138 is a plane, which is angled with respect to the radial line formed by the shaft 132 with respect to its pivot, axis 130 (FIG. 8). The radial direction of the shaft 132 is indicated by the line 140. It is important that the face 138 be parallel to the top surface of the silicon slab 126, which is mounted on the vacuum plate stage 52. A plurality of cylindrical bores 142 is formed in the shaft 132. The bores 142 receive cylindrical weights, which are selected to adjust the pressure that is exerted by the tip 136 against a fiber 12 that is being assembled into the silicon slab 126.

Figure 7:
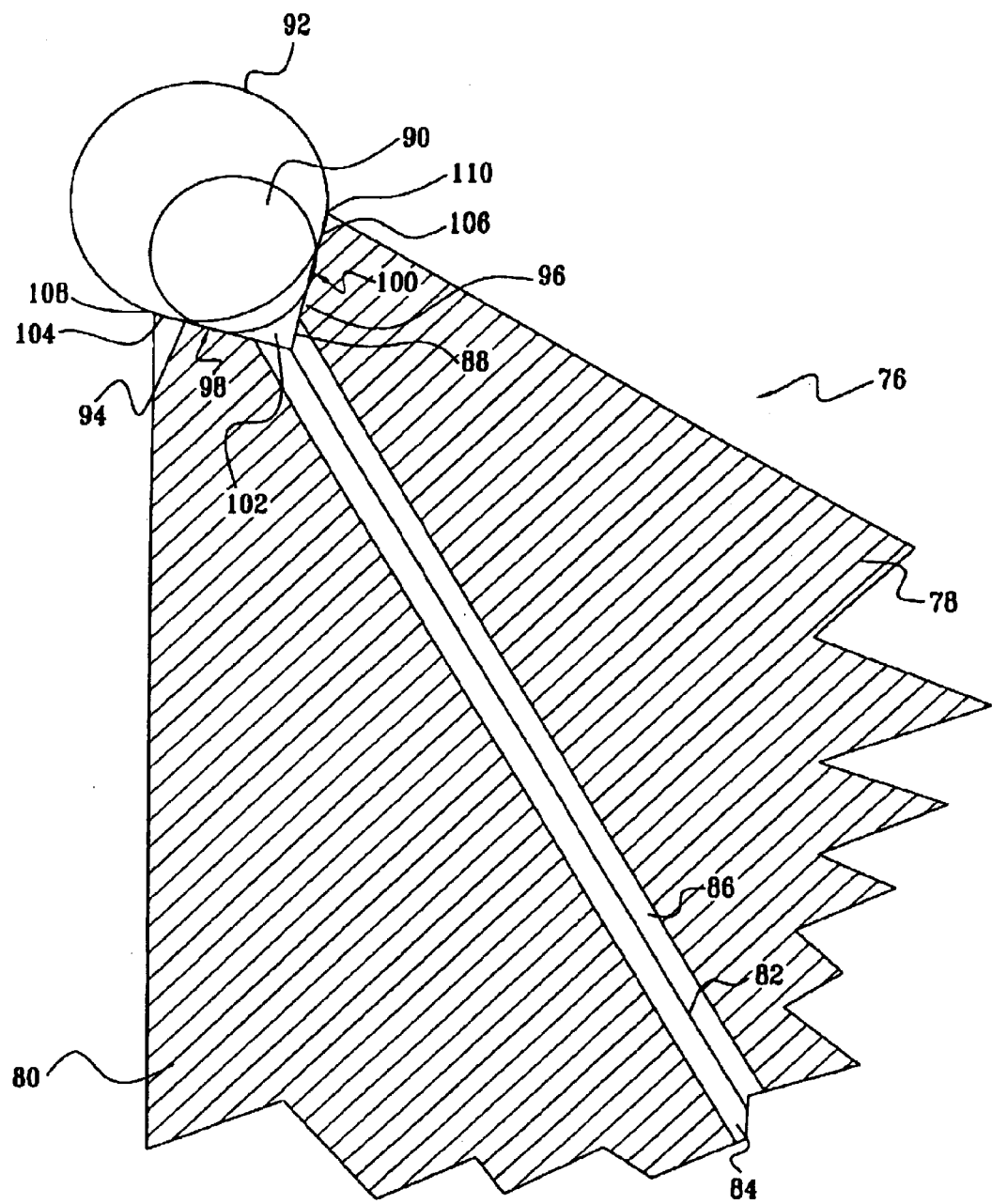
FIG. 7 is a composite sectional view through a portion of a gripping subassembly of the assembly station shown in FIG. 3.

Reference is now made to FIG. 7, which is a sectional view of a tip 76 of the gripping assembly 50. The description of FIG. 7 is to be read in conjunction with FIG. 5 and FIG. 6. Two opposing jaws 78, 80 are approximated to one another along a line 82, such that grooves 84, 86 formed in the jaws 78, 80 provide closed fluid channels leading to a vacuum pump (not shown) via the hose 60. The grooves 84, 86 open into a V-shaped groove 88 that is formed at the free end of the tip 76. An object, such as the smaller fiber 90 or a larger fiber 92 is received into the groove 88. The fiber 90 makes contact with the side walls 94, 96 at points 98, 100, creating a semi-closed region 102 where the air pressure is lower than the ambient air pressure. Consequently the fiber 90 is urged against the side walls 94, 96, and is held in a stable position thereon. It will be noted that the side walls 94, 96 form tangent planes with the cylindrical outer surface of the fiber 90. The tangent planes are represented as tangent lines on the sectional view of FIG. 7. It is important that the groove 88 be dimensioned such that tangents are formed at the point of contact on the side walls 94, 96 for the gripping assembly 50 to operate optimally. For example the fiber 92 contacts the side walls 94, 96 at points 104, 106 and therefore is held successfully by the gripping assembly 50. However a fiber larger than the fiber 92 would merely contact the tip 76 at cusps 108, 110 and would not form the requisite tangent plane. Its stability could not be assured.

Operation.

Reference is again made to FIGS. 2–6. The operation of the assembly station 30 will now be disclosed. Initially a bottom portion 22 of a silicon slab is mounted on the vacuum plate stage 52 and held in place using the vacuum transmitted by the hose 62. The stereo-microscope 70 is adjusted to view the bottom portion 22, and in particular the grooved section 32.

Operations on an optical fiber are then begun. The fiber 12 is inserted through the slit 146 of the fiber rotator 42, initially positioned such that it lies in a designated groove of the grooved section 32, with its free end coinciding with the free edge 23 of the bottom portion 22. The fiber is then secured in the fiber rotator 42 using the clamp 148. The positioning is accomplished by applying vacuum to the gripping assembly 50, and then by clamping the intermediate portion of the fiber 12 using the clamp 64, the clamp 66, and the clamp 68 (FIG. 4). Actuation of the gripping assembly 50 provides the fine control needed to precisely place the fiber 12 in a desired position. The video camera 72 (FIG. 3) is adjusted such that its direction of view is aligned with the Z-axis, and the free edge 23 of the bottom portion 22 and the free end of the fiber 12 are visualized en face. The magnification of the video camera 72 is adjusted such that the relationship of the fiber 12 to its associated V-groove is seen clearly. The weight 112 and the weight 114 are applied to the fiber 12 to further immobilize it in a desired position so that it is aligned in the Y-axis with other optical fibers that are inserted in other grooves of the grooved section 32.

Figure 10:
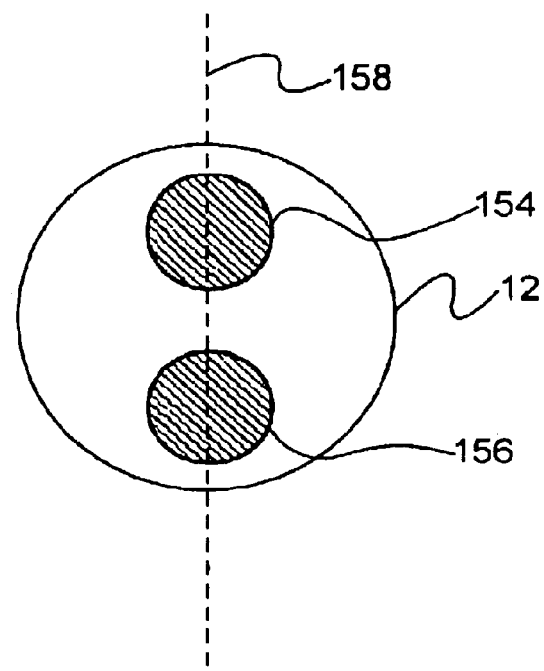
FIG. 10 is an end view of an optical fiber having a polarization angle.

Reference is now made to FIG. 10, which shows an end view of an optical fiber 12. The description of FIG. 10 is to be read in conjunction with FIG. 4, FIG. 5, and FIG. 6. The view of the fiber-optic assembly 10 is similar to that seen by the video camera 72. Two circles 154, 156 define the polarization axis of the optical fiber 12, which may be adjusted by the operator such that they are in vertical alignment, indicated by their orientation with respect to the vertical line 158. The actuator 38 and the actuator 40 control movement of the stage 36 independently of the vacuum plate stage 52, so that the optical fiber 12 is allowed to move in the Z-axis or to undergo theta-Z motion relative to the bottom portion 22. During the alignment the operator also controls the actuator 54 and the actuator 56 of the vacuum plate stage 52 so that the bottom portion 22 and the weights 112, 114 can move in the X-axis and the Y-axis relative to the optical fiber 12. If it is necessary for the operator to move the weights 112, 114 on the X-axis and the Z-axis relative to the bottom portion 22, the X-actuator 160 and the Z-actuator 162 are provided to control movements of the stage 116, which carries the weights 112, 114. The operator then rotates the fiber 12 about its optical axis using the fiber rotator 42 until its polarization axis is in a desired orientation. In its final position, the fiber 12 rests in its designated V-groove of the bottom portion 22, is aligned with other optical fibers of the assembly in the Y-axis, and is rotationally aligned, such that its polarization axis has a desired orientation with respect to the Y-axis.

Suitable glue, such as UV-glue, is then applied in order to secure the fiber 12 to the bottom portion 22, and allowed to cure. The gripping assembly 50, the clamp 64, the clamp 66, and the clamp 68, the weight 112 and the weight 114 are released, and the fiber 12 removed from the fiber rotator 42.

The above described operations fiber are then repeated until all the V-grooves are occupied by optical fibers, or until a predetermined number of optical fibers have been emplaced in the bottom portion 22. The assembly of the fiberoptic assembly 10 is completed by gluing the top portion 20 to the bottom portion 22 with an epoxy glue to form a housing over the optical fibers, and then polishing the end faces of the optical fibers using known methods.

Alternate Embodiment

Figure 11:
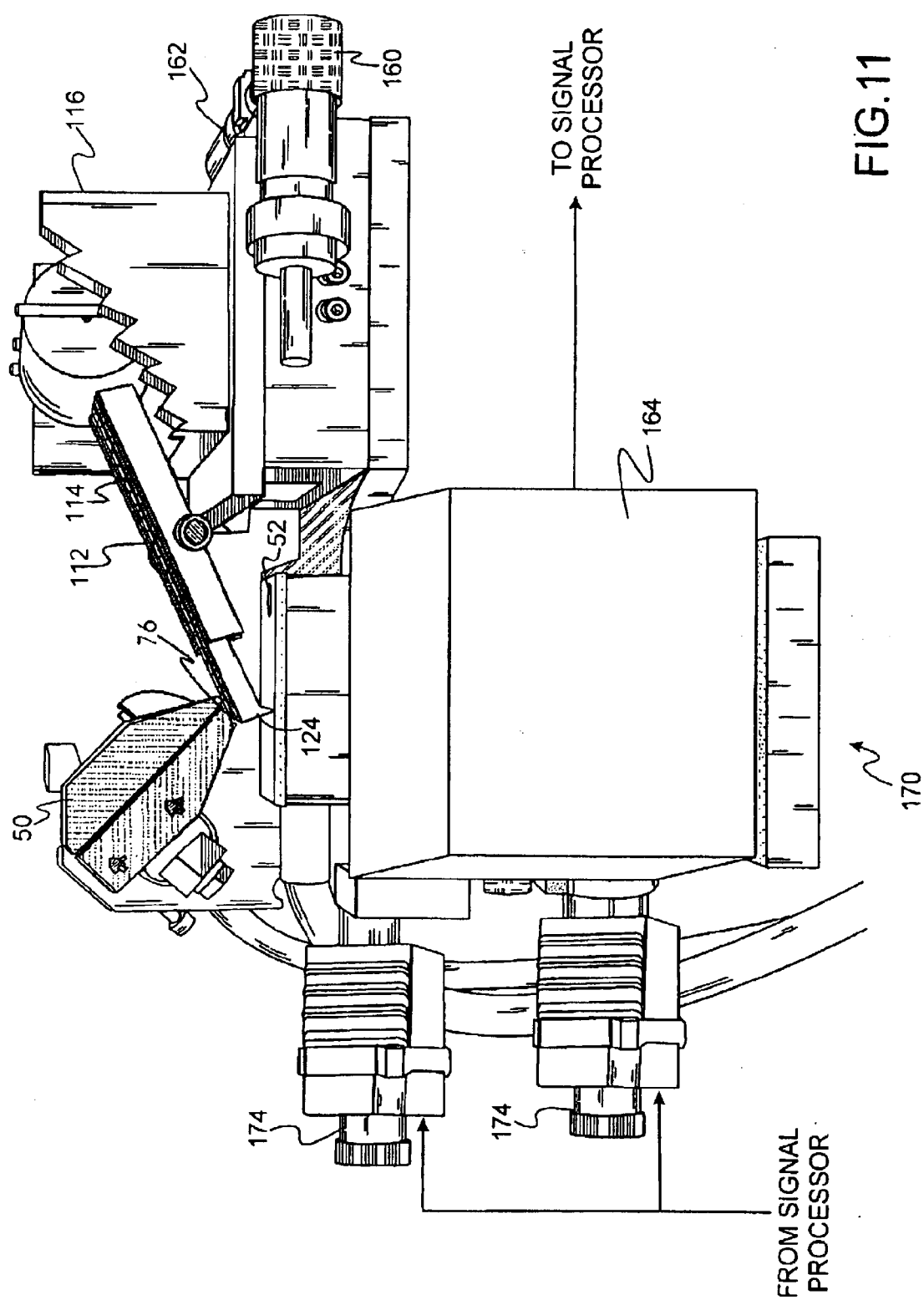
FIG. 11 is a partially schematic view similar to FIG. 3, illustrating an assembly station that is constructed and operative in accordance with an alternate embodiment of the invention.

The above described embodiment relies on skilled human operators. Reference is now made to FIG. 11, which semi-schematically illustrates an assembly station that is constructed and operative in accordance with an alternate embodiment of the invention. An assembly station 170 is similar to the assembly station 30 of the first embodiment. However, the video camera has been replaced by a power and polarization detector 164. The output of the detector 164 is coupled to a suitable signal processor (not shown), which applies control signals to industrial motors 174 which drive the various actuators of the assembly station 170. The actuators can thus be controlled automatically, without intervention of a human operator.

While this invention has been explained with reference to the structure disclosed herein, it is not confined to the details set forth and this application is intended to cover any modifications and changes as may come within the scope of the following claims:

What is claimed is:

1. Apparatus for manufacturing a fiberoptic device, comprising:
   a fiber rotator mounted on a first stage, said fiber rotator carrying an optical fiber therein, and being operative to rotate said optical fiber about an optical axis thereof;
   a second stage for holding a silicon slab;
   a fiber gripping assembly disposed between said first stage and said second stage for gripping an intermediate portion of said optical fiber;
   a first viewer directed toward said silicon slab along an axis that is orthogonal to said optical axis and orthogonal to a surface of said second stage upon which said silicon slab rests;
   a second viewer directed toward an end face of said optical fiber alone said optical axis;
   a weight, mounted on a third stage, a free end of said weight impinging on said optical fiber to urge an end portion of said optical fiber onto said silicon slab,
   wherein responsive to views displayed by said first viewer and said second viewer, said first stage, said second stage, said fiber rotator, and said fiber gripping assembly are independently adjustable to establish said optical fiber in a desired position on said silicon slab, and
   wherein said weight is pivotally mounted and pivots between a first position wherein said weight is in a non-contacting relationship with said optical fiber and a second position wherein said weight impinges on said optical fiber.

2. Apparatus for manufacturing a fiberoptic device, comprising:
   a fiber rotator mounted on a first stage, said fiber rotator carrying an optical fiber therein, and being operative to rotate said optical fiber about an optical axis thereof;
   a second stage for holding a silicon slab;
   a fiber gripping assembly disposed between said first stage and said second stage for gripping an intermediate portion of said optical fiber;
   a first viewer directed toward said silicon slab along an axis that is orthogonal to said optical axis and orthogonal to a surface of said second stage upon which said silicon slab rests;
   a second viewer directed toward an end face of said optical fiber along said optical axis;
   a weight, mounted on a third stage, a free end of said weight impinging on said optical fiber to urge an end portion of said optical fiber onto said silicon slab,
   wherein responsive to views displayed by said first viewer and said second viewer, said first stage, said second stage, said fiber rotator, and said fiber gripping assembly are independently adjustable to establish said optical fiber in a desired position on said silicon slab, and
   wherein said weight comprises:
      a first weight that urges said end portion of said optical fiber into a groove formed in said silicon slab; and
      a second weight that urges said end portion of said optical fiber onto a flat portion of said silicon slab.

3. Apparatus for manufacturing a fiberoptic device, comprising:
   a fiber rotator mounted on a first stage, said fiber rotator carrying an optical fiber therein, and being operative to rotate said optical fiber about an optical axis thereof;
   a second stage for holding a silicon slab;
   a fiber gripping assembly disposed between said first stage and said second stage for gripping an intermediate portion of said optical fiber;
   a first viewer directed toward said silicon slab along an axis that is orthogonal to said optical axis and orthogonal to a surface of said second stage upon which said silicon slab rests;
   a second viewer directed toward an end face of said optical fiber along said optical axis;
   wherein responsive to views displayed by said first viewer and said second viewer, said first stage, said second stage, said fiber rotator, and said fiber gripping assembly are independently adjustable to establish said optical fiber in a desired position on said silicon slab,
   wherein said fiber gripping assembly is supplied by a vacuum line, and includes a channel formed therein for establishing fluid communication between said vacuum line and a tip portion of said fiber gripping assembly, and
   wherein said optical fiber is held in said tip portion of said fiber gripping assembly by suction transmitted via said channel.

4. The apparatus according to claim 3, wherein said tip portion has a groove formed therein, and said optical fiber is received in said groove.

5. The apparatus according to claim 4, wherein said groove is dimensioned such that a surface of said optical fiber contacts a first side wall of said groove and contacts a second side wall of said groove.

6. Apparatus for manufacturing a fiberoptic device comprising:
   a fiber rotator mounted on a first stage, said fiber rotator carrying an optical fiber therein, and being operative to rotate said optical fiber about an optical axis thereof;
   a second stage for holding a silicon slab, said second stage being connected to a vacuum line and said silicon slab being exposed to vacuum transmitted via said vacuum line;
   a fiber gripping assembly disposed between said first stage and said second stage for gripping an intermediate portion of said optical fiber;
   a first viewer directed toward said silicon slab along an axis that is orthogonal to said optical axis and orthogonal to a surface of said second stage upon which said silicon slab rests;
   a second viewer directed toward an end face of said optical fiber along said optical axis;
   wherein responsive to views displayed by said first viewer and said second viewer, said first stage, said second stage, said fiber rotator, and said fiber gripping assembly are adjustable to establish said optical fiber in a desired position on said silicon slab.

* * * * *